(12) United States Patent
Wang et al.

(10) Patent No.: US 11,442,097 B2
(45) Date of Patent: Sep. 13, 2022

(54) METHOD AND APPARATUS FOR CALCULATING KINK CURRENT OF SOI DEVICE

(71) Applicant: Soochow University, Suzhou (CN)

(72) Inventors: Mingxiang Wang, Suzhou (CN); Yanyan Chen, Suzhou (CN); Dongli Zhang, Suzhou (CN); Huaisheng Wang, Suzhou (CN)

(73) Assignee: Soochow University, Suzhou (CN)

( * ) Notice: Subject to any disclaimer, the term of this patent is extended or adjusted under 35 U.S.C. 154(b) by 209 days.

(21) Appl. No.: 16/959,633

(22) PCT Filed: Jun. 10, 2019

(86) PCT No.: PCT/CN2019/090565
§ 371 (c)(1),
(2) Date: Jul. 1, 2020

(87) PCT Pub. No.: WO2020/237717
PCT Pub. Date: Dec. 3, 2020

(65) Prior Publication Data
US 2021/0405107 A1    Dec. 30, 2021

(30) Foreign Application Priority Data
May 31, 2019    (CN) .......................... 201910467871.7

(51) Int. Cl.
*G01R 31/02*   (2006.01)
*G01R 31/26*   (2020.01)
*G01R 31/28*   (2006.01)
*G01R 31/27*   (2006.01)
(Continued)

(52) U.S. Cl.
CPC ..... *G01R 31/2623* (2013.01); *G01R 31/2601* (2013.01); *G01R 31/2621* (2013.01); *G01R 31/275* (2013.01); *G01R 31/2884* (2013.01); *G01R 31/2642* (2013.01);
(Continued)

(58) Field of Classification Search
CPC ............ G01R 31/2623; G01R 31/2601; G01R 31/2621; G01R 31/2884; G01R 31/275; G01R 31/2831; G01R 31/2642; G01R 31/3004; H01L 27/1203
USPC ......... 324/71, 378, 403, 415, 425, 500, 537, 324/762.01, 762.09
See application file for complete search history.

(56) References Cited

U.S. PATENT DOCUMENTS

| | | | |
|---|---|---|---|
| 2001/0028089 A1* | 10/2001 | Adan | H01L 29/78612 257/349 |
| 2017/0040461 A1* | 2/2017 | Tarakji | H01L 29/7838 |
| 2017/0358686 A1* | 12/2017 | Tarakji | H01L 29/78615 |

OTHER PUBLICATIONS

"Kink Model for SOI MOSFET"; Kaifi, Mohammad; 2011 (Year: 2011).*
CN107315673 Machine Translation; Jun. 29, 2017 (Year: 2017).*

* cited by examiner

*Primary Examiner* — Raul J Rios Russo
(74) *Attorney, Agent, or Firm* — Wang Law Firm, Inc.

(57) ABSTRACT

The present application discloses a method and apparatus for calculating the kink current of SOI device, which is used to solve the problem that the kink current calculation in the prior art is not accurate and is not suitable for circuit simulation. The method includes: obtaining the impact ionization factor, the parasitic transistor effect factor, and the drain saturation current of the SOI device respectively; and calculating the kink current of the SOI device according to the impact ionization factor, the parasitic transistor effect factor, and the drain saturation current.

16 Claims, 7 Drawing Sheets

(51) Int. Cl.
*H01L 27/12* (2006.01)
*G01R 31/30* (2006.01)
(52) U.S. Cl.
CPC ...... *G01R 31/2831* (2013.01); *G01R 31/3004* (2013.01); *H01L 27/1203* (2013.01)

METHOD AND APPARATUS FOR CALCULATING KINK CURRENT OF SOI DEVICE

TECHNICAL FIELD

The application relates to the technical field of semiconductor devices, and in particular, to a method and apparatus for calculating kink current of an SOI device.

BACKGROUND

Figure 1:
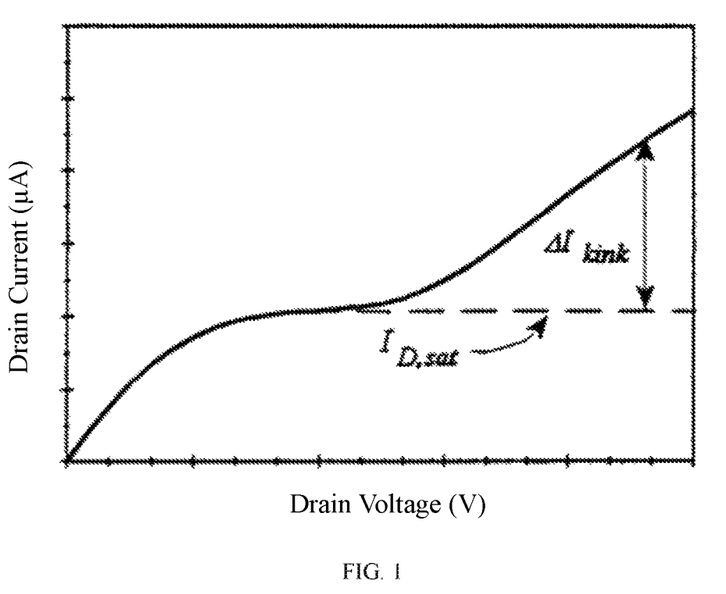
FIG. 1 is a schematic diagram of the kink current of SOI device.

Silicon on Insulator (SOI) refers to the structure of a silicon transistor on an insulator substrate. SOI devices are similar to MOSFETs in structure and belong to the field effect devices, but SOI devices are fabricated on insulating substrate rather than MOSFETs on a semiconductor substrate. Broadly speaking, "Silicon" represents the channel layer of an SOI device, and it can be not only single-crystalline silicon, but also amorphous silicon, polysilicon, oxide semiconductors, organic semiconductors, etc.; "Insulator" represents the insulating layer substrate of an SOI device. It can be glass, quartz, or a silicon substrate covering a thin $SiO_2$ layer. When the drain terminal of an SOI device is biased to a sufficiently large voltage, its output characteristics of the SOI device will experience an anomalous current increase, namely the kink effect. The excess current in this part is referred to as the kink current, as shown in FIG. 1. An accurate, analytical and physical-based kink current model is essential for circuit design and simulation.

The kink current calculation method for an SOI device in the prior art includes:

① Based on the floating body effect, all possible current components through the back channel are taken into account, but the model involves many parameters and the current form is too complicated to be suitable for circuit simulation.

② Models are introduced by calculating the multiplication factor M, such as the RPI model. In the work of Jacunski et al., the multiplication factor M is obtained by integrating the impact ionization rate in the drain depletion region along the depletion region. The relationship between the kink current and the multiplication factor M is:

$$I_{kink} = M \cdot I_{Dsat},$$

where $I_{Dsat}$ is the drain saturation current and M is the multiplication factor.

The multiplication factor M can be expressed empirically as follows:

$$M = \left(\frac{L_{kink}}{L}\right)^{m_{kink}} \left(\frac{V_D - \alpha_{sat} V_{GT}}{V_{kink}}\right) \exp\left(\frac{-V_{kink}}{V_D - \alpha_{sat} V_{GT}}\right)$$

where $L_{kink}$ and $m_{kink}$ are fitting parameters, L is the channel length, $V_D$ is the drain voltage, $V_{kink}$ is the drain voltage when the kink effect occurs, $V_{GT} = V_{GS} - V_T$ is the effective gate voltage ($V_{GS}$ is the gate voltage, $V_T$ is the threshold voltage), and $\alpha_{sat}$ is a parameter related to pinch-off at the drain.

Figure 2:
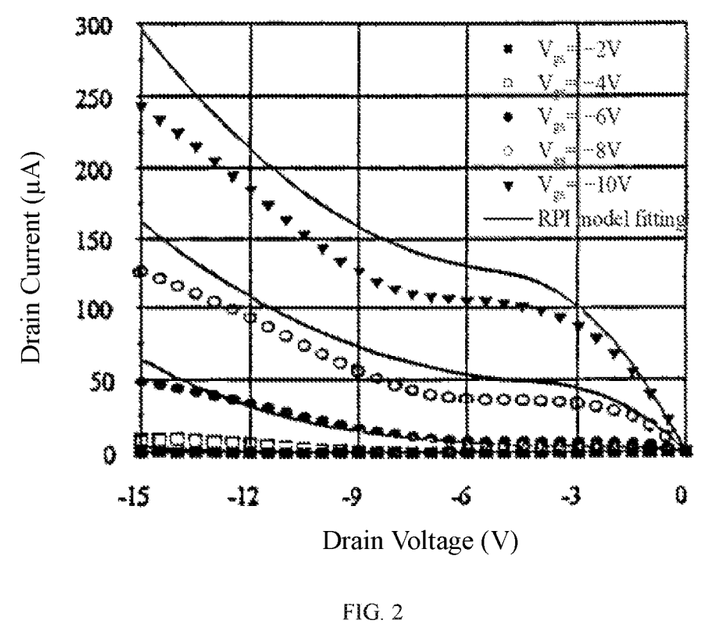
FIG. 2 is a schematic diagram when Jacunski et al. used RPI model for fitting in the background technique.
Figure 3:
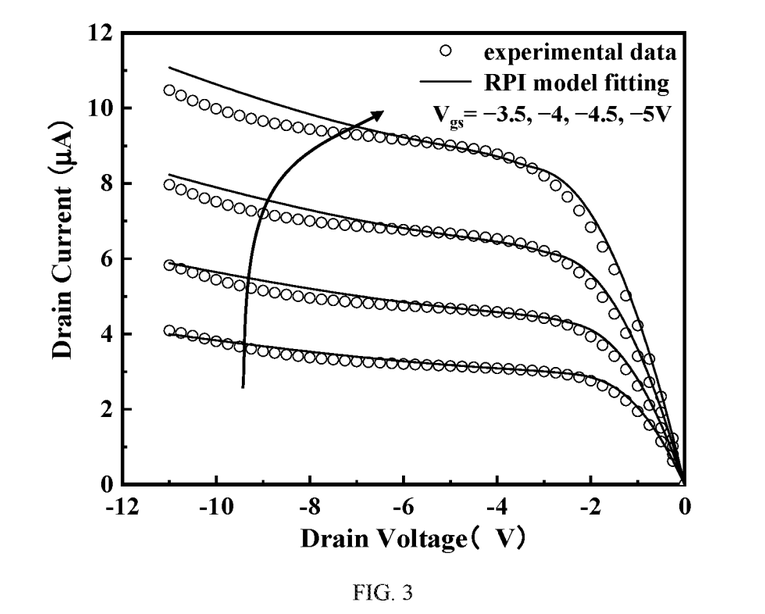
FIG. 3 is a schematic diagram when the applicant uses RPI model for fitting.

The multiplication factor M in method ② depends on the empirical formula. It cannot be well applied to the output characteristic curves at multiple gate voltages. As shown in FIG. 2, the experimental object is a P-type polysilicon thin film transistor. The five output characteristic curves from bottom to top correspond to the gate voltage $V_{gs} = -2, -4, -6, -8, -10V$, respectively. The applicant found the same disadvantage when using this model for fitting. As shown in FIG. 3, the experimental object is a P-type polysilicon thin film transistor. The four output characteristic curves from bottom to top correspond to the gate voltage $V_{gs} = -3.5, -4, -4.5, -5V$, respectively.

Therefore, how to accurately model and calculate the kink current of SOI device is still a problem that needs to be solved at present.

SUMMARY

Embodiments of the disclosure provide a kink current calculation method and apparatus for an SOI device, which are used to solve the problem that the kink current calculation method of an SOI device in the prior art cannot be well described quantitatively.

In one embodiment, the method comprises: obtaining the impact ionization factor, the parasitic bipolar junction transistor effect factor, and the drain saturation current of the SOI device respectively; calculating the kink current of the SOI device according to the impact ionization factor, the parasitic transistor effect factor, and the drain saturation current.

In one embodiment, obtaining the parasitic transistor effect factor of the SOI device specifically includes:

Obtaining the channel length and the carrier diffusion length in the body region of the SOI device, and calculating the parasitic transistor effect factor of the SOI device according to the channel length and the carrier diffusion length in the body region.

In one embodiment, the parasitic transistor effect factor of the SOI device has a hyperbolic secant dependence on the channel length and the carrier diffusion length in the body region of the SOI device;

preferably, the parasitic transistor effect factor is:

$$\text{sech}\left(\frac{L}{L_b}\right)$$

where L is the channel length of the SOI device and $L_b$ is the carrier diffusion length in the body region of the SOI device.

In one embodiment, the impact ionization factor of the SOI device has an exponential relationship with the threshold field F, characterizing the impact ionization, the depletion region width $I_d$, the drain voltage $V_D$, and the interpolation function $V_{Dse}$ related to drain saturation voltage of the SOI device;

preferably, the impact ionization factor is:

$$\frac{(V_D - V_{Dse})}{l_d} \exp\left(-\frac{F_I l_d}{V_D - V_{Dse}}\right);$$

alternatively, the impact ionization factor of the SOI device has an exponential relationship with the drain voltage $V_D$, the voltage parameter $V_k$ associated with the kink effect, and the interpolation function $V_{Dse}$ related to drain saturation voltage of the SOI device;

preferably, the impact ionization factor is:

$$\frac{(V_D - V_{Dse})}{V_k} \exp\left(-\frac{V_k}{V_D - V_{Dse}}\right).$$

In one embodiment, the calculation method for kink current $I_{kink}$ of the SOI device is:

$$I_{kink} = C\frac{(V_D - V_{Dse})}{l_d}\exp\left(-\frac{F_I l_d}{V_D - V_{Dse}}\right)\text{sech}\left(\frac{L}{L_b}\right)I_{Dsat}; \quad (1)$$

where C is a parameter related to the material and geometry of the SOI device, L is the channel length of the SOI device, $V_D$ is the drain voltage of the SOI device, $V_{Dse}$ is the interpolation function related to the drain saturation voltage, $F_I$ is the threshold field for impact ionization of the SOI device, $L_b$ is the carrier diffusion length in the body region of the SOI device, and $I_{Dsat}$ is the drain saturation current of the SOI device; Or, The calculation method for kink current $I_{kink}$ of the SOI device is:

$$I_{kink} = C_k\frac{(V_D - V_{Dse})}{V_k}\exp\left(-\frac{V_k}{V_D - V_{Dse}}\right)\text{sech}\left(\frac{L}{L_b}\right)I_{Dsat}; \quad (2)$$

where $C_k$ is a parameter related to the material and geometry of the SOI device, L is the channel length of the SOI device, $V_D$ is the drain voltage of the SOI device, $V_{Dse}$ is the interpolation function related to the drain saturation voltage, $V_k$ is the voltage parameter associated with the kink effect, $L_b$ is the carrier diffusion length in the body region of the SOI device, and $I_{Dsat}$ is the drain saturation current of the SOI device.

In one embodiment, the method further comprises:
parameter extraction of threshold field $F_I$:
obtaining drain current $I_D$ and drain saturation current $I_{Dsat}$ of multiple long-channel SOI devices with fixed channel width but varied channel lengths at multiple gate voltages;
using equation (1) to establish the function with the threshold field $F_I$ as the slope in long-channel SOI devices;
according to the drain current $I_D$ and drain saturation current $I_{Dsat}$ of the multiple long-channel SOI devices at multiple gate voltages, and the function with the threshold field $F_I$ as the slope in long-channel devices, calculating the threshold fields for impact ionization of the multiple long-channel SOI devices at multiple gate voltages; preferably,
the method further comprises:
parameter extraction of carrier diffusion length $L_b$ in the body region:
using equation (1) to establish the function with $$-\frac{1}{L_b}$$

as the slope in long-channel SOI devices;
calculating the average value of the threshold fields for impact ionization of each long-channel SOI device at multiple gate voltages, respectively;
according to the average value of the threshold fields for impact ionization of each long-channel SOI device at multiple gate voltages, and the function with $$-\frac{1}{L_b}$$

as the slope in long-channel devices, calculating the carrier diffusion lengths in the body region of the multiple long-channel SOI devices at multiple gate voltages; preferably,
the method further comprises:
extraction of parameter C:
calculating the average value of carrier diffusion lengths in the body region of the multiple long-channel SOI devices at multiple gate voltages:
according to the average value of carrier diffusion lengths in the body region of the multiple long-channel SOI devices at multiple gate voltages, and the average value of the threshold fields for impact ionization of each long-channel SOI device at multiple gate voltages, calculating the parameter C in equation (1) of the multiple long-channel SOI devices at multiple gate voltages.

In one embodiment, the method further comprises:
averaging the threshold fields for impact ionization of each long-channel SOI device at multiple gate voltages, respectively, and obtaining the initial fitting values of the threshold field $F_I$ in equation (1) of each long-channel SOI devices; and/or,
averaging the carrier diffusion lengths in the body region of the multiple long-channel SOI devices at multiple gate voltages, and obtaining the fitting value of the carrier diffusion length $L_b$ in the body region in equation (1); and/or,
taking the average value of the parameter C of the multiple long-channel SOI devices at multiple gate voltages as the initial fitting value of the parameter C in equation (1);
substituting the initial fitting value of the parameter C into equation (1), and according to the average value of the carrier diffusion lengths in the body region of the multiple long-channel SOI devices at multiple gate voltages, determining the threshold fields for impact ionization of each SOI device at multiple gate voltages, respectively, as the fitting value of the threshold field $F_I$ in equation (1) of each long-channel SOI device:
repeating the parameter C extraction steps to obtain the fitting values of the parameter C in equation (1) for the multiple long-channel SOI devices at multiple gate voltages.

In one embodiment, the method further comprises:
extraction of parameter $V_k$:
obtaining drain current $I_D$ and drain saturation current $I_{Dsat}$ of multiple long-channel SOI devices with fixed channel width but varied channel lengths at multiple gate voltages;
using equation (2) to establish the function with $V_k$ as the slope in long-channel SOI devices;
according to the drain current $I_D$ and drain saturation current $I_{Dsat}$ of the multiple long-channel SOI devices at multiple gate voltages, and the function with $V_k$ as the slope in long-channel devices, calculating $V_k$ of the multiple long-channel SOI devices at multiple gate voltages; preferably,
the method further comprises:
parameter extraction of carrier diffusion length $L_b$ in the body region and $C_k$:
using equation (2) to establish the function with $$-\frac{1}{L_b}$$

as the slope and $\ln(2C_k)$ as the intercept in long-channel SOI devices;
calculating the $V_k$ average value of each long-channel SOI device at multiple gate voltages, respectively;

according to the $V_k$ average value of each long-channel SOI device at multiple gate voltages, and the function with $$-\frac{1}{L_b}$$

as the slope, $\ln(2C_k)$ as the intercept in long-channel devices, calculating the carrier diffusion lengths $L_b$ in the body region and $C_k$ of the multiple long-channel SOI devices at multiple gate voltages.

In one embodiment, the method further comprises:

averaging $C_k$ values of the multiple long-channel SOI devices at multiple gate voltages, and obtaining the fitting value of $C_k$ in equation (2); and/or, averaging the carrier diffusion lengths in the body region of the multiple long-channel SOI devices at multiple gate voltages, and obtaining the fitting value of the carrier diffusion length $L_b$ in the body region in equation (2); and/or, substituting the average value of parameter $C_k$ and $L_b$ of the multiple long-channel SOI devices at multiple gate voltages into equation (2), respectively, and obtaining the $V_k$ fitting values in equation (2) of the multiple long-channel SOI devices at multiple gate voltages.

In another embodiment, the disclosure describes a kink current calculation apparatus for SOI device. In this embodiment, the apparatus comprises: one or more processors; and one or more computer memory devices arranged to store computer-executable instructions, wherein the one or more processors execute the computer-executable instructions to implement the kink current calculation method for an SOI device as described above.

In the embodiment of the present application, two factors that affect the kink current in the SOI device are considered when calculating the kink current of the SOI device, namely, the impact ionization factor and the parasitic transistor effect factor, so that the calculated kink current of the SOI device is more accurate without any empirical parameters introduced, and has a good fitting performance at different gate voltages for a group of SOI devices of different channel lengths; at the same time, the parameters used in this calculation method are easy to extract and suitable for circuit simulation.

BRIEF DESCRIPTION OF THE DRAWINGS

In order to more clearly illustrate the technical solutions of the embodiments of the present application, the drawings used in the description of the embodiments will be briefly described below. It is obvious that the drawings in the following description are only some embodiments of the present application. Those skilled in the art can also obtain other drawings based on these drawings without paying any creative work.

DESCRIPTION OF THE EMBODIMENTS

The technical solutions in the embodiments of the present application are clearly and completely described in the following with reference to the accompanying drawings in the embodiments of the present application. It is obvious that the described embodiments are only some embodiments of the present application, rather than all embodiments. All other embodiments obtained by those skilled in the art based on the embodiments of the present application without paying any creative work fall within the scope of protection of the present application.

Figure 4:
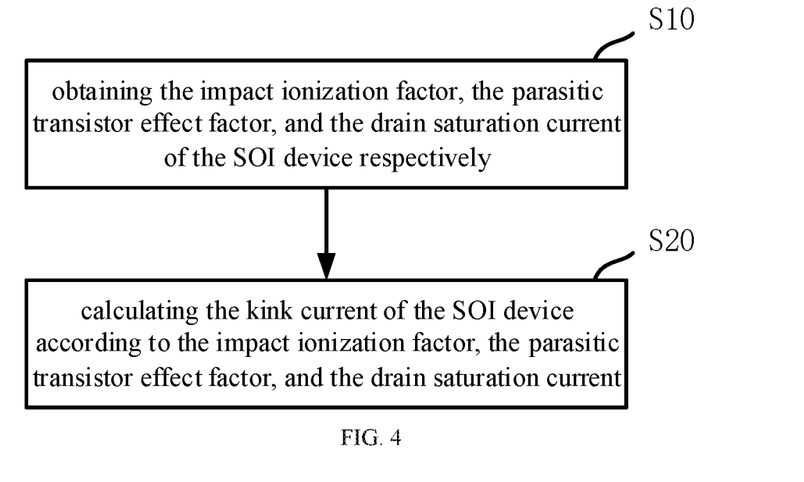
FIG. 4 is a flowchart of the current calculation method of SOI device provided by an embodiment of the application.

Referring to FIG. 4, an embodiment of the kink current calculation method of an SOI device in this present application is introduced. In this embodiment, the method includes the following steps.

S10, Obtaining the impact ionization factor, the parasitic transistor effect factor, and the drain saturation current of the SOI device, respectively;

When the drain of the SOI device is biased at a large voltage, impact ionization in the drain depletion region generates a large number of electron-hole pairs. It is enhanced by a parasitic bipolar junction transistor, and an additional positive feedback occurs in the body region. Therefore, by adding the impact ionization factor and the parasitic transistor effect factor to the kink current calculation of the SOI device, the factors that affect the kink current in the SOI device can be better elaborated, making the calculated kink current of the SOI device more accurate.

Specifically, one can obtain the channel length and the carrier diffusion length in the body region of the SOI device, and the parasitic transistor effect factor of the SOI device can be calculated according to the channel length and the carrier diffusion length in the body region. The parasitic transistor effect factor of the SOI device has a hyperbolic secant dependence on the channel length and the carrier diffusion length in the body region of the SOI device.

It should be noted that in the following embodiments: if a P-type SOI device is shown, the carrier diffusion length in the body region corresponds to the electron diffusion length; accordingly, if an N-type SOI device is shown, the carrier diffusion length in the body region corresponds to the hole diffusion length.

In one embodiment, the parasitic transistor effect factor of the SOI device is:

$$\mathrm{sech}\left(\frac{L}{L_b}\right)$$

where L is the channel length of the SOI device and $L_b$ is the carrier diffusion length in the body region of the SOI device.

The impact ionization factor of the SOI device has an exponential relationship with the threshold field $F_I$ characterizing the impact ionization, the depletion region width $l_d$, the drain voltage $V_D$, and the interpolation function $V_{Dse}$ related to drain saturation voltage of the SOI device;

In one embodiment, the impact ionization factor is:

$$\frac{(V_D - V_{Dse})}{l_d} \exp\left(-\frac{F_I l_d}{V_D - V_{Dse}}\right);$$

Alternatively, the impact ionization factor of the SOI device has an exponential relationship with the drain voltage $V_D$, the voltage parameter $V_k$ associated with the kink effect, and the interpolation function $V_{Dse}$ related to drain saturation voltage of the SOI device;

In one embodiment, the impact ionization factor is:

$$\frac{(V_D - V_{Dse})}{V_k} \exp\left(-\frac{V_k}{V_D - V_{Dse}}\right).$$

S20, Calculating kink current of the SOI device according to the impact ionization factor, the parasitic transistor effect factor, and the drain saturation current.

In the following, the calculation method of the kink current $I_{kink}$ of the SOI device in step S20 will be described through different embodiments.

Embodiment 1

The calculation method for kink current $I_{kink}$ of the SOI device is:

$$I_{kink} = C \frac{(V_D - V_{Dse})}{l_d} \exp\left(-\frac{F_I l_d}{V_D - V_{Dse}}\right) \text{sech}\left(\frac{L}{L_b}\right) I_{Dsat}; \quad (1)$$

where C is a parameter related to the material and geometry of the SOI device, L is the channel length of the SOI device, $V_D$ is the drain voltage of the SOI device, $V_{Dse}$ is the interpolation function related to the drain saturation voltage (which links the transition between the linear and saturation region, and respectively approaches the drain voltage $V_D$ in the linear region and $V_{Dsat}$ in the saturation region), $l_d$ is the depletion region width of the SOI device, $F_I$ is the threshold field for impact ionization of the SOI device, $L_b$ is the carrier diffusion length in the body region of the SOI device, $I_{Dsat}$ is the drain saturation current of the SOI device, and sech (x) is the hyperbolic secant function $$\left(\text{sech}x = \frac{2}{e^x + e^{-x}}\right).$$

In particular, for long-channel SOI devices, the channel length L is much larger than the carrier diffusion length $L_b$ in the body region, so:

$$\text{sech}\left(\frac{L}{L_b}\right) \approx 2\exp\left(-\frac{L}{L_b}\right),$$

So the above kink current calculation method of SOI device can be changed as:

$$I_{kink} = 2C \frac{(V_D - V_{Dse})}{l_d} \exp\left(-\frac{F_I l_d}{V_D - V_{Dse}}\right) \exp\left(-\frac{L}{L_b}\right) I_{Dsat}.$$

It can be seen that, in the kink current calculation method of the SOI device in the embodiment of the present application, the kink current and the channel length L of the SOI device can be further approximated as an exponential dependency, and this kink current calculation method of the SOI device is all based on physical parameters without any empirical parameters involved, which is more accurate and reliable.

In one embodiment, the above-mentioned parameter C can be expressed as $$\frac{I_0 \tau_b}{A E_I n_i},$$

where $I_0$ is the reverse saturation current of the SOI device, $\tau_b$ is the carrier lifetime in the body region, A is the effective cross-sectional area of the avalanche zone through which current flows, $E_I$ is the threshold energy for impact ionization, and $n_i$ is the intrinsic carrier concentration. It should be noted that the expression of the parameter C here is only an exemplary description, rather than a limitation to the present application. In the subsequent steps of fitting the parameter C, it is not necessary to rely on the above-mentioned $I_0$, $\tau_b$, A, $E_I$, $n_i$ to determine the parameter C. Therefore, in different embodiments, the parameter C is not necessarily such an expression, and may have different definitions, which are all within the protection scope of the present application.

In one embodiment, the drain saturation current $I_{Dsat}$ of the SOI device can be expressed as:

$$I_{Dsat} = \frac{W}{L - l_d + V_{Dse}/E_{sat}} \mu_{eff} C_{ox} \left(V_{GT} - \frac{1}{2}V_{Dse}\right) V_{Dse}$$

where W is the width of the SOI device, L is the channel length of the SOI device, $l_d$ is the width of the depletion region, $\mu_{eff}$ is the effective channel mobility, $C_{ox}$ is the gate oxide capacitance per unit area, $V_{Dse}$ is an interpolation function related to the drain saturation voltage, which respectively approaches $V_D$ in the linear region and $V_{Dsat}$ in the saturation region, $E_{sat}$ is the characteristic field for carrier velocity saturation, and $V_{GT}$ is the effective gate voltage.

In another embodiment, the drain saturation current $I_{Dsat}$ of the SOI device can also be expressed as:

$$I_{Dsat} = \mu_{FET} C_{ox} \frac{W}{L} \frac{(V_{GS} - V_t)\alpha_{sat}}{2}$$

where $\mu_{FET}$ is the field effect mobility, $C_{ox}$ is the gate oxide capacitance per unit area, W is the width of the SOI device, L is the channel length of the SOI device, $V_{GS}$ is the gate voltage, $V_t$ is the threshold voltage, and $\alpha_{sat}$ is a parameter related to the pinch-off at the drain.

It can be understood that the above only exemplarily gives two calculation methods of the drain saturation current $I_{Dsat}$ of the SOI device, rather than a limitation to this application.

In more embodiments, those skilled in the art can select different drain saturation current models according to actual usage requirements, and these transformed embodiments should still fall within the protection scope of the present application.

In this embodiment, the method also includes the parameter extraction and fitting steps of the threshold field $F_I$, the parameter extraction and fitting steps of the carrier diffusion length $L_b$ in the body region, and the parameter C extraction and fitting steps. Exemplarily, the above steps are all based on a group of polysilicon thin film transistors with the fixed width (W) but varied channel lengths (L). Specifically, S101, the parameter extraction steps of threshold field $F_I$ comprise:

obtaining drain current $I_D$ and drain saturation current $I_{Dsat}$ of multiple long-channel SOI devices with fixed channel width but varied channel lengths at multiple gate voltages;

equation (1) is used to establish the function with the threshold field $F_I$ as the slope in long-channel SOI devices;

according to the drain current $I_D$ and drain saturation current $I_{Dsat}$ of the multiple long-channel SOI devices at multiple gate voltages, and the function with the threshold field $F_I$ as the slope in long-channel devices, the threshold fields for impact ionization of the multiple long-channel SOI devices at multiple gate voltages can be calculated.

In one embodiment, for long-channel SOI devices, the channel length L is much larger than the carrier diffusion length $L_b$ in the body region, so $$\operatorname{sech}\left(\frac{L}{L_b}\right) = 2\exp\left(-\frac{L}{L_b}\right),$$

where $I_{kink} = I_D - I_{Dsat}$. Equation (1) can be transformed into $$\ln\left[\frac{(I_D - I_{Dsat})l_d}{I_{Dsat}(V_D - V_{Dse})}\right] = -F_I\left(\frac{l_d}{V_D - V_{Dse}}\right) + \ln(2C) - \frac{L}{L_b};$$

Let $$y = \frac{(I_D - I_{Dsat})l_d}{I_{Dsat}(V_D - V_{Dse})}, \quad x = \frac{l_d}{V_D - V_{Dse}},$$

and the plot ln y~x can be obtained. $F_I$ is the slope, and the threshold fields for impact ionization of multiple long-channel SOI devices at multiple gate voltages can be obtained.

S102, the parameter extraction steps of carrier diffusion length $L_b$ in the body region comprise:

equation (1) is used to establish the function with $$-\frac{1}{L_b}$$

as the slope in long-channel SOI devices;

the average value of the threshold fields for impact ionization of each long-channel SOI device at multiple gate voltages is calculated separately;

according to the average value of the threshold fields for impact ionization of each long-channel SOI device at multiple gate voltages, and the function with $$-\frac{1}{L_b}$$

as the slope in long-channel devices, the carrier diffusion lengths in the body region of the multiple long-channel SOI devices at multiple gate voltages can be calculated.

In one embodiment, equation (1) can be transformed into $$\ln\left[\frac{(I_D - I_{Dsat})l_d}{I_{Dsat}(V_D - V_{Dse})}\right] + F_I\left(\frac{l_d}{V_D - V_{Dse}}\right) = -\frac{L}{L_b} + \ln(2C);$$

Let $$Y = \ln\left[\frac{(I_D - I_{Dsat})l_d}{I_{Dsat}(V_D - V_{Dse})}\right] + F_I\left(\frac{l_d}{V_D - V_{Dse}}\right)$$

and the slope of the plot Y~L is $$-\frac{1}{L_b}.$$

With the threshold fields for impact ionization of multiple long-channel SOI devices extracted in step S101 at multiple gate voltages, their average values for an SOI device at different gate voltages can be obtained, and then are substituted into the above equation to obtain the carrier diffusion lengths in the body region of multiple long-channel SOI devices at multiple gate voltages.

S103, the extraction steps of parameter C comprise:

the average value of carrier diffusion lengths in the body region of the multiple long-channel SOI devices at multiple gate voltages is calculated;

according to the average value of carrier diffusion lengths in the body region of the multiple long-channel SOI devices at multiple gate voltages, and the average value of the threshold fields for impact ionization of each long-channel SOI device at multiple gate voltages, the parameter C values in equation (1) of the multiple long-channel SOI devices at multiple gate voltages are calculated.

S104, the threshold fields for impact ionization of each long-channel SOI device at multiple gate voltages are averaged, respectively, and the initial fitting value of the threshold field F, in equation (1) of each long-channel SOI devices is obtained.

S105, the carrier diffusion lengths in the body region of the multiple long-channel SOI devices at multiple gate voltages are averaged, and the fitting value of the carrier diffusion length $L_b$ in the body region in equation (1) is obtained.

S106, the average value of the parameter C of the multiple long-channel SOI devices at multiple gate voltages is taken as the initial fitting value of the parameter C in equation (1);

the initial fitting value of the parameter C is resubstituted into equation (1), and according to the average value of the carrier diffusion lengths in the body region of the multiple long-channel SOI devices at multiple gate voltages, the threshold field for impact ionization of each SOI device at multiple gate voltages is determined separately, as the fitting value of the threshold field F, in equation (1) of each long-channel SOI device;

the parameter C extraction steps are repeated to obtain the fitting values of the parameter C in equation (1) for the multiple long-channel SOI devices at multiple gate voltages.

In this way, the fitting values of the three parameters threshold field $F_f$, carrier diffusion length $L_b$ in body region, and C can be obtained. The fitting value of the threshold field $F_f$ has a linear dependence on the channel length L. Based on this, the kink current of other SOI devices in the same fabrication process can be readily calculated.

Of course, in more embodiments, the technical solutions of the present application may further include re-substituting the fitting values of the three parameters, namely, the threshold field $F_f$, the carrier diffusion length $L_b$ in the body region, and C, into the formula (1) and iterating the above steps of parameter extraction and fitting multiple times to further obtain the fitting values which can achieve a satisfactory fitting performance for three parameters of the threshold field $F_f$, the carrier diffusion length $L_b$ in the body region, and C. Such an embodiment should still be within the concept of the present application.

Two specific experimental examples are provided below to further explain the kink current calculation method of the SOI device of this embodiment.

Experimental Example 1

Device type: P-type excimer laser annealed polycrystalline silicon thin film transistors.
W/L: 10/25 µm, 10/20 µm, 10/15 µm and 10/10 µm.
Gate voltage: $V_{gs}$=−3.5, −4, −4.5, −5V.
The fitting values of the threshold field are as follows:

| $V_{gs}$(V) | $F_1(\times 10^5$ V/cm) fitting value | | | |
| --- | --- | --- | --- | --- |
| | 10/25 | 10/20 | 10/15 | 10/10 |
| −3.5 | 2.10 | 2.45 | 2.75 | 3.00 |
| −4 | 2.10 | 2.45 | 2.75 | 3.00 |
| −4.5 | 2.10 | 2.45 | 2.75 | 3.00 |
| −5 | 2.10 | 2.45 | 2.75 | 3.00 |

The fitting value of the carrier diffusion length $L_b$ in the body region (Here the carrier diffusion length refers to the electron diffusion length) is as follows (Since the extracted values of $L_b$ at different gate voltages are close, the average value is used as the fitting value):

| $V_{gs}$(V) | $L_b$ (µm) fitting values |
| --- | --- |
| −3.5 | 4.5 |
| −4 | 4.5 |
| −4.5 | 4.5 |
| −5 | 4.5 |

The fitting values of parameter C are as follows:

| $V_{gs}$(V) | C(cm/V) fitting values | | | |
| --- | --- | --- | --- | --- |
| | 10/25 | 10/20 | 10/15 | 10/10 |
| −3.5 | 0.20 | 0.20 | 0.20 | 0.20 |
| −4 | 0.18 | 0.18 | 0.18 | 0.16 |
| −4.5 | 0.14 | 0.14 | 0.16 | 0.12 |
| −5 | 0.10 | 0.10 | 0.12 | 0.10 |

Figure 5:
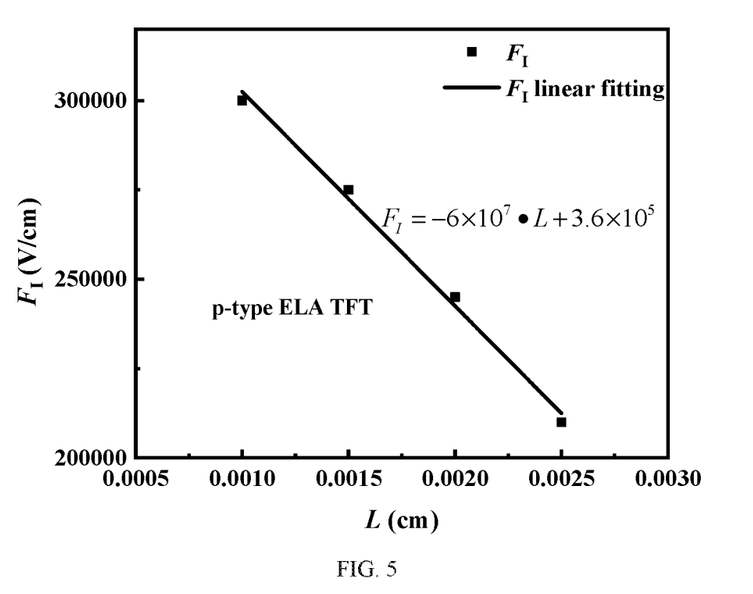
FIG. 5 is a schematic diagram of the relationship between $F_I$ fitting value and the channel length L in experimental example 1 of the present application.
Figure 6:
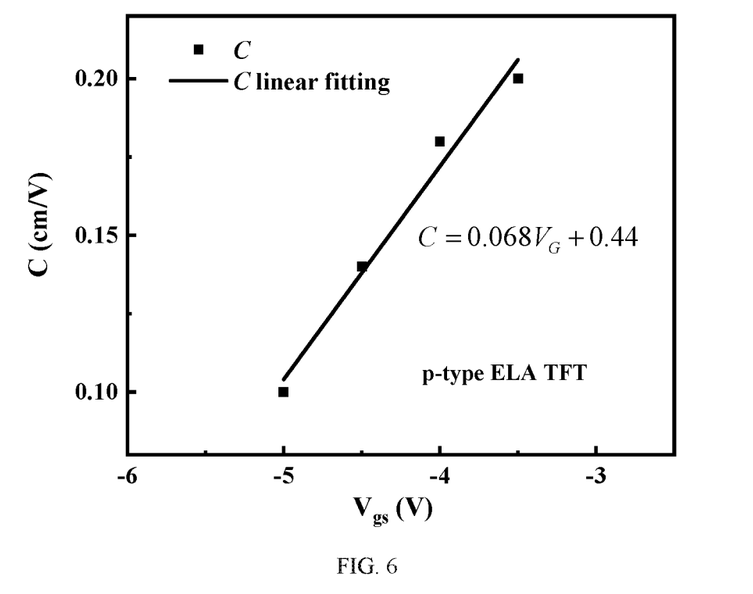
FIG. 6 is a schematic diagram of the relationship between the C fitting value and the gate voltage in experimental example 1 of the present application.
Figure 7:
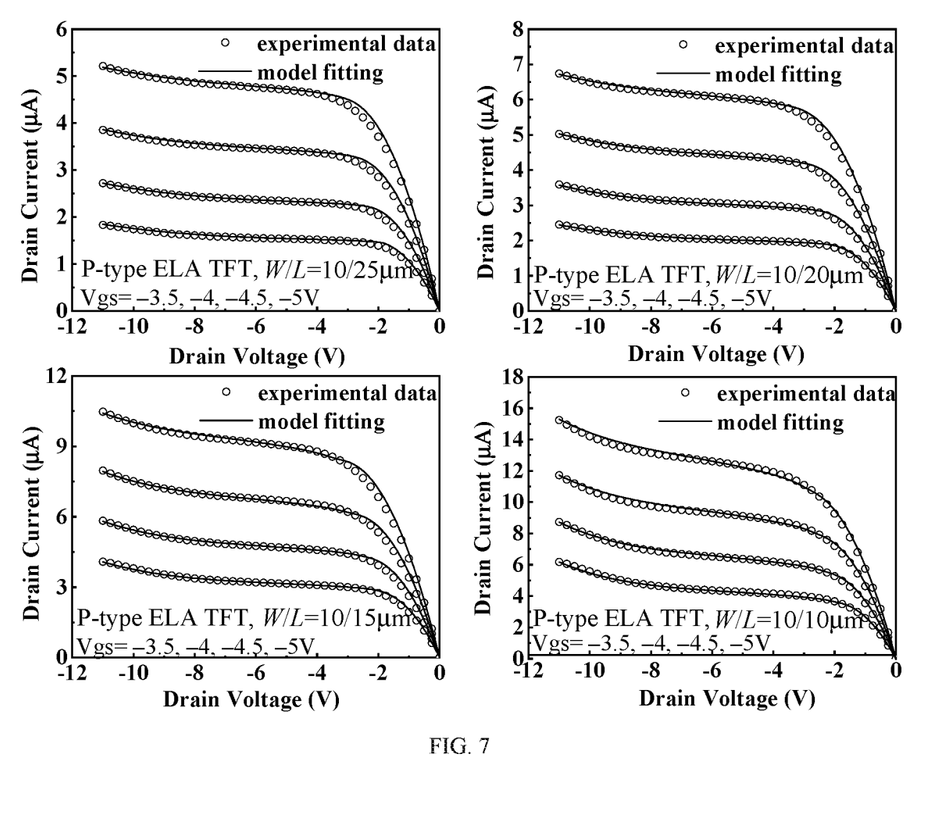
FIG. 7 is a schematic diagram for kink current fitting of multiple SOI devices at multiple gate voltages in experimental example 1 of the present application.

It can be seen from this experimental example that the same set of C values can be used for SOI devices with different W/Ls. C has a linear dependence on the gate voltage $V_{gs}$, the carrier diffusion length $L_b$ uses a fixed fitting value, and the threshold field $F_f$ is also the same at different gate voltages. Specifically, the relationship between the threshold field $F_f$ and the channel length L is shown in FIG. 5, and the relationship can be described by a parameter equation, $F_f = k_1 \cdot L + b_1$. For the P-type excimer laser annealed polycrystalline silicon thin film transistors, the parameters are: $k_1 = -6 \times 10^7$ V/cm², $b_1 = 3.6 \times 10^5$ V/cm; the relationship between C and the gate voltage $V_{gs}$ is shown in FIG. 6, and the relationship can also be described by a linear parameter equation, $C = k_2 \cdot V_{gs} + b_2$. For the P-type excimer laser annealed polycrystalline silicon thin film transistors, the parameters are: $k_2 = 0.068$ cm/V², $b_2 = 0.44$ cm/V. With reference to FIG. 7 (where the drain current and the gate voltage are positively correlated, the four output characteristic curves correspond to the gate voltage $V_{gs}$=−3.5, −4, −4.5, −5V from bottom to top, respectively), it can be seen that in the kink current calculation method of the SOI device of the present application, the fitting kink current is highly close to the experimental data, showing a good fitting performance.

Experimental Example 2

Device type: N-type metal-induced laterally crystallized (MILC) polysilicon thin film transistor (the carrier diffusion length in the body refers to the hole diffusion length).
W/L: 10/25 µm, 10/20 µm, 10/15 µm and 10/10 µm.
Gate voltage: $V_{gs}$=11, 12, 13, 14V.

Figure 8:
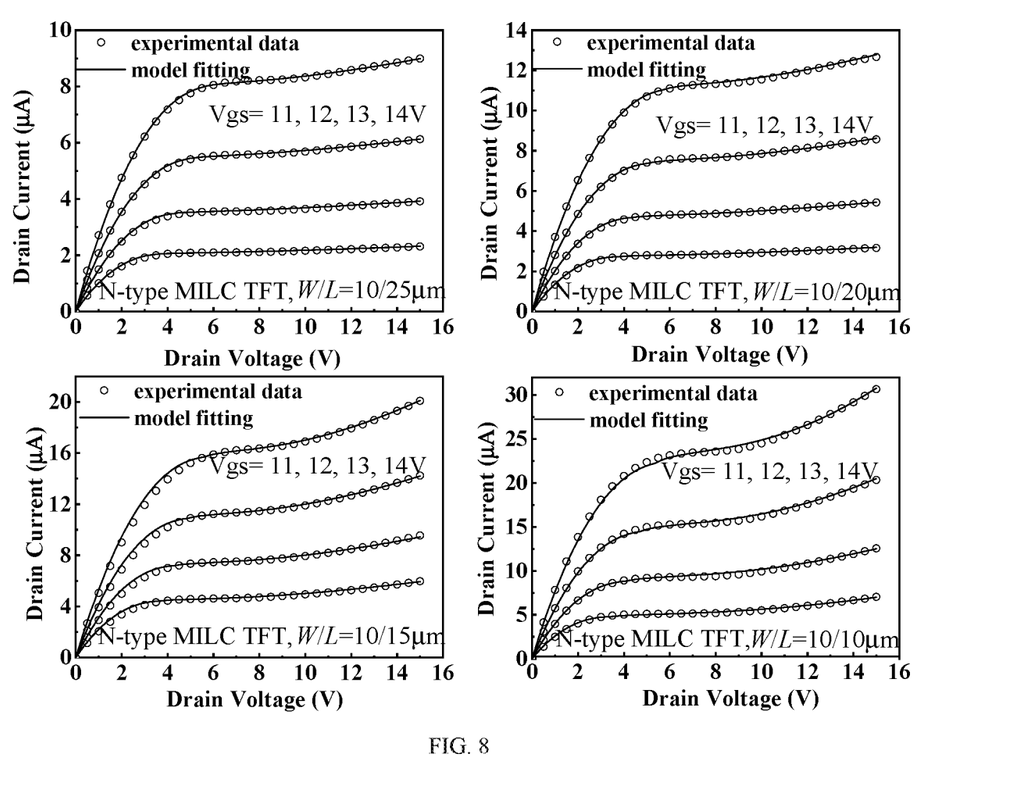
FIG. 8 is a schematic diagram for kink current fitting of multiple SOI devices at multiple gate voltages in experimental example 2 of the present application.

Similarly, referring to FIG. 8 (where the drain current is positively related to the gate voltage, the four output characteristic curves correspond to the gate voltage $V_{gs}$=11, 12, 13, 14V from bottom to top, respectively), it can be seen that the fitting kink current is highly close to the experimental data, showing a good fitting performance.

From the above experimental examples, it can be seen that the kink current calculation method provided by the present application has a good fitting performance on n- and p-type devices over a wide process range from low defect density excimer laser annealed (ELA) process to high defect density metal induced laterally crystallized (MILC) process. Similarly, there is also a good fitting effect on the partially depleted SOI device with fewer defect states, which will not be repeated here.

Embodiment 2

The calculation method for kink current $I_{kink}$ of the SOI device is:

$$I_{kink} = C_k \frac{(V_D - V_{Dse})}{V_k} \exp\left(-\frac{V_k}{V_D - V_{Dse}}\right) \text{sech}\left(\frac{L}{L_b}\right) I_{Dsat} \quad (2)$$

where $C_k$ is a parameter related to the material and geometry of the SOI device, L is the channel length of the SOI device, $V_D$ is the drain voltage of the SOI device, $V_{Dse}$ is the interpolation function related to the drain saturation voltage (which links the transition between the linear and saturation region, and respectively approaches the drain voltage $V_D$ in the linear region and $V_{Dsat}$ in the saturation region), $V_k$ is the voltage parameter associated with the kink effect, $L_b$ is the carrier diffusion length in the body region of the SOI device, $I_{Dsat}$ is the drain saturation current of the SOI device, and sech (x) is the hyperbolic secant function $$\left(\text{sech}\,x = \frac{2}{e^x + e^{-x}}\right).$$

In particular, for long-channel SOI devices, the channel length L is much larger than the carrier diffusion length $L_b$ in the body region, so:

$$\text{sech}\left(\frac{L}{L_b}\right) = 2\exp\left(-\frac{L}{L_b}\right),$$

So the above kink current calculation method of SOI device can be changed as:

$$I_{kink} = 2C_k \frac{(V_D - V_{Dse})}{V_k} \exp\left(-\frac{V_k}{V_D - V_{Dse}}\right) \exp\left(-\frac{L}{L_b}\right) I_{Dsat}.$$

It can be seen that, in the kink current calculation method of the SOI device in the embodiment of the present application, the kink current and the channel length L of the SOI device can be further approximated as an exponential dependency, and this kink current calculation method of the SOI device is all based on physical parameters without any empirical parameters involved, which is more accurate and reliable.

It should be noted that the selection of the drain saturation current of the SOI device can refer to the first embodiment, which will not be described in detail here.

In this embodiment, the method also includes the parameter $V_k$ extraction and fitting steps, the parameter extraction and fitting steps of the carrier diffusion length $L_b$ in the body region, and the parameter C extraction and fitting steps. Exemplarily, the above steps are all based on a group of polysilicon thin film transistors with the fixed width (W) but varied channel lengths (L). Specifically, S201, the extraction steps of parameter $V_k$ comprise:

obtaining drain current $I_D$ and drain saturation current $I_{Dsat}$ of multiple long-channel SOI devices with fixed channel width but varied channel lengths at multiple gate voltages;

equation (2) is used to establish the function with $V_k$ as the slope in long-channel SOI devices;

according to the drain current $I_D$ and drain saturation current $I_{Dsat}$ of the multiple long-channel SOI devices at multiple gate voltages, and the function with $V_k$ as the slope in long-channel devices, $V_k$ values of the multiple long-channel SOI devices at multiple gate voltages are calculated.

In one embodiment, for long-channel SOI devices, the channel length L is much larger than the carrier diffusion length $L_b$ in the body region, so $$\text{sech}\left(\frac{L}{L_b}\right) \approx 2\exp\left(-\frac{L}{L_b}\right),$$

where $I_{kink} = I_D - I_{Dsat}$. Equation (2) can be transformed into $$\ln\left(\frac{I_D - I_{Dsat}}{I_{Dsat}}\right) = -\frac{V_k}{V_D - V_{Dse}} - L/L_b + \ln(2C_k);$$

Let $$y = \frac{I_D - I_{Dsat}}{I_{Dsat}}, x = -1/(V_D - V_{Dse}),$$

and the plot ln y~x can be obtained. $V_k$ is the slope, and parameter $V_k$ of multiple long-channel SOI devices at multiple gate voltages can be obtained.

It should be noted that, in the deformation of the above formula (2), since $$\ln\left(\frac{V_D - V_{Dse}}{V_k}\right) \text{ in}$$

$$\ln\left(\frac{I_D - I_{Dsat}}{I_{Dsat}}\right) = \ln\left(\frac{V_D - V_{Dse}}{V_k}\right) - \frac{V_k}{V_D - V_{Dse}} - L/L_b + \ln(2C_k)$$

is a logarithmic term, it is a slowly varying term relative to the linear term $$\frac{V_k}{V_D - V_{Dse}},$$

which can be ignored when extracting the slope.

S202, the parameter extraction steps of carrier diffusion length $L_b$ in the body region and $C_k$ comprise:

equation (2) is used to establish the function with $$-\frac{1}{L_b}$$

as the slope and $\ln(2C_k)$ as the intercept in long-channel SOI devices:

the $V_k$ average value of each long-channel SOI device at multiple gate voltages is calculated separately;

According to the $V_k$ average value of each long-channel SOI device at multiple gate voltages, and the function with $$-\frac{1}{L_b}$$

as the slope, $\ln(2C_k)$ as the intercept in long-channel devices, the carrier diffusion length $L_b$ in the body region and $C_k$ of the multiple long-channel SOI devices at multiple gate voltages are calculated.

In one embodiment, equation (2) can be transformed into $$\ln\left(\frac{I_D - I_{Dsat}}{I_{Dsat}}\right) - \ln\left(\frac{V_D - V_{Dse}}{V_k}\right) + \frac{V_k}{V_D - V_{Dse}} = -L/L_b + \ln(2C_k);$$

Let $$Y = \ln\left(\frac{I_D - I_{Dsat}}{I_{Dsat}}\right) - \ln\left(\frac{V_D - V_{Dse}}{V_k}\right) + \frac{V_k}{V_D - V_{Dse}},$$

and one can obtain that the slope of the plot Y~L is $$-\frac{1}{L_b}$$

and the intercept is $\ln(2C_k)$. With $V_k$ values of multiple long-channel SOI devices extracted in step S201 at multiple gate voltages, their average value for an SOI device at different gate voltages can be obtained, and then are substituted into the above equation to obtain the carrier diffusion lengths $L_b$ in the body region and $C_k$ of multiple long-channel SOI devices at multiple gate voltages.

S203, $C_k$ values of the multiple long-channel SOI devices at multiple gate voltages are averaged, and the fitting value of $C_k$ in equation (2) is obtained.

S204, the carrier diffusion lengths in the body region of the multiple long-channel SOI devices at multiple gate voltages are averaged, and the fitting value of the carrier diffusion length $L_b$ in the body region in equation (2) is obtained.

S205, the average of parameter $C_k$ and $L_b$ of the multiple long-channel SOI devices at multiple gate voltages are substituted into equation (2), respectively, and the $V_k$ fitting values in equation (2) of the multiple long-channel SOI devices at multiple gate voltages are obtained.

In this way, the fitting values of the three parameters $V_k$, carrier diffusion length $L_b$ in body region, and $C_k$ can be obtained. The $L_b$ and $C_k$ obtained by the fitting are kept constant, and $V_k$ has a certain linear dependence on the channel length L and the gate voltage $V_g$. Based on this, the kink current of other SOI devices in the same fabrication process can be readily predicted.

Similar to the first embodiment, in this embodiment, the fitting values of the three parameters of $V_k$, the carrier diffusion length $L_b$ in the body region, and $C_k$ can be further re-substituted into formula (2), and iterate the above steps of parameter extraction and fitting multiple times to obtain the fitting values which can achieve a satisfactory fitting performance for three parameters of $V_k$, the carrier diffusion length $L_b$ in the body region, and $C_k$.

A specific experimental example is provided below to further explain the kink current calculation method of the SOI device of this embodiment.

Experimental Example 3

Device type: P-type excimer laser annealed polycrystalline silicon thin film transistor (the carrier diffusion length in the body region refers to the electron diffusion length).

W/L: 10/25 μm, 10/20 μm, 10/15 μm and 10/10 μm.
Gate voltage: $V_{gs}$=−3.5, −4, −4.5, −5V.
The final parameter fitting values are as follows:

| | $V_k$ (V) fitting values | | | | $L_b$ (μm) fitting value | $C_k$ (×$10^2$) fitting value |
|---|---|---|---|---|---|---|
| $V_{gs}$(V) | L = 25 | L = 20 | L = 15 | L = 10 | | |
| −3.5 | 38 | 42 | 46 | 49 | 6.4 | 9.5 |
| −4 | 38 | 43 | 46 | 50 | 6.4 | 9.5 |
| −4.5 | 39 | 44 | 46 | 52 | 6.4 | 9.5 |
| −5 | 40 | 45 | 47 | 53 | 6.4 | 9.5 |

Figure 9:
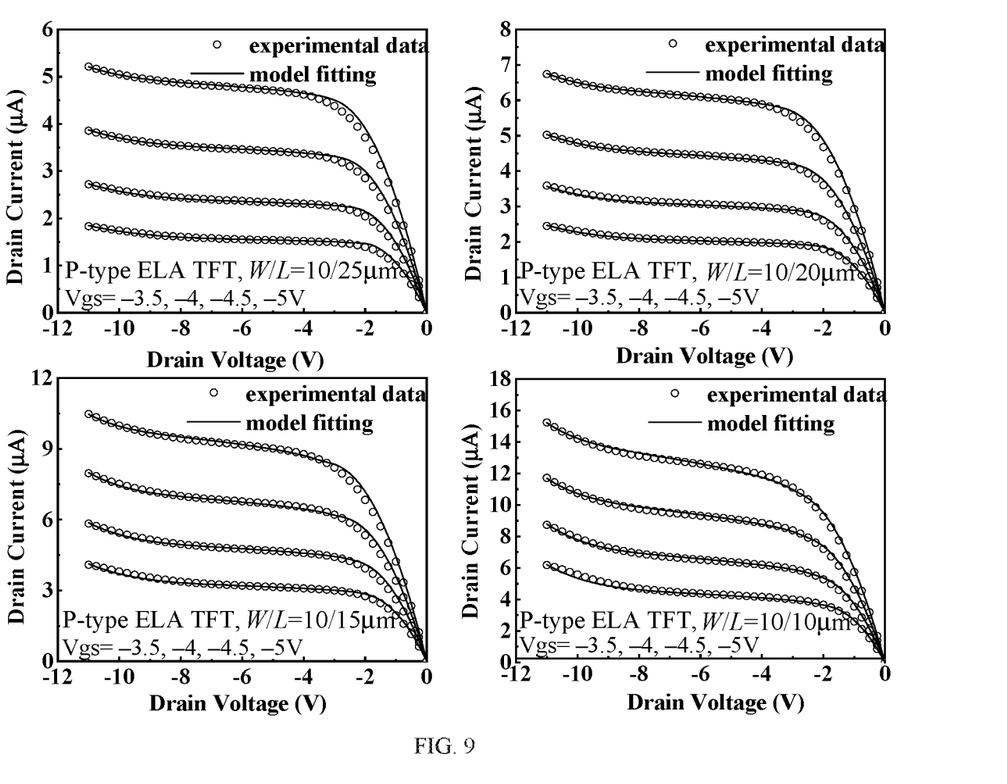
FIG. 9 is a schematic diagram for kink current fitting of multiple SOI devices at multiple gate voltages in experimental example 3 of the present application.

It can be seen from this experimental example that $L_b$ and $C_k$ are both constants, and $V_k$ has a certain linear dependence on the gate voltage $V_{gs}$ and the channel length L. Specifically, it is expressed by a parameter equation: $V_k=V_{k0}+a \cdot V_{gs}+b \cdot L$. For the P-type excimer laser annealed polycrystalline silicon thin film transistors, the parameters are: $V_{k0}$=52.2V, a=−1.7, b=−8×$10^3$V/cm. With reference to FIG. 9 (where the drain current and the gate voltage are positively correlated, the four output characteristic curves correspond to the gate voltage $V_{gs}$=−3.5, −4, −4.5, −5V from bottom to top, respectively), it can be seen that in the kink current calculation method of the SOI device of the present application, the fitting kink current is highly close to the experimental data, showing a good fitting performance.

Figure 10:
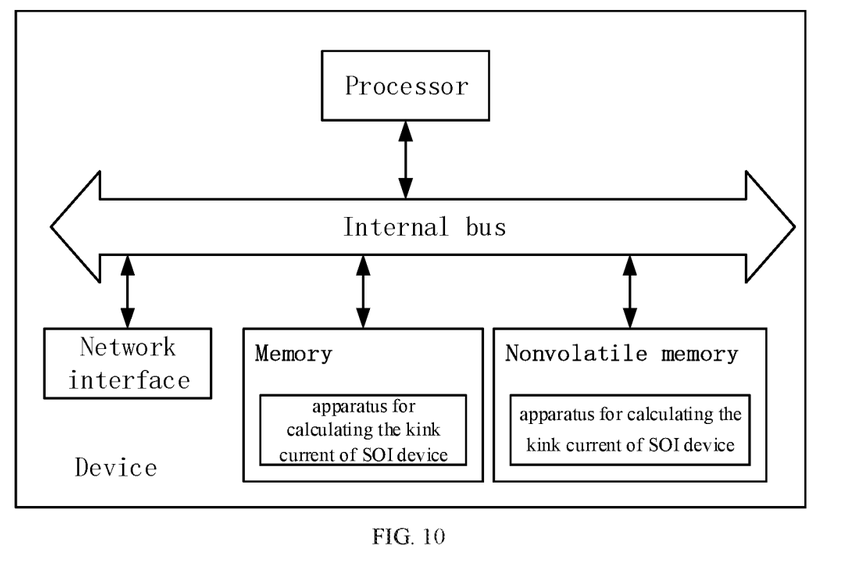
FIG. 10 is a schematic diagram of the apparatus structure provided by one embodiment of the present application.

FIG. 10 is a schematic structural diagram illustrating an electronic device, according to an implementation of the present application. Referring to FIG. 10, the electronic device includes a processor, an internal bus, a network interface, memory, and a non-volatile memory, and certainly can further include other hardware needed by a service at the hardware level. The processor reads a corresponding computer program from the non-volatile memory to the memory for running, and an apparatus for calculating the kink current of SOI device is logically formed. Certainly, in addition to a software implementation, the present application does not exclude another implementation, for example, a logic device or a combination of hardware and software. That is, an execution body of the following processing procedure is not limited to each logical unit, and can also be hardware or a logic device.

Figure 11:
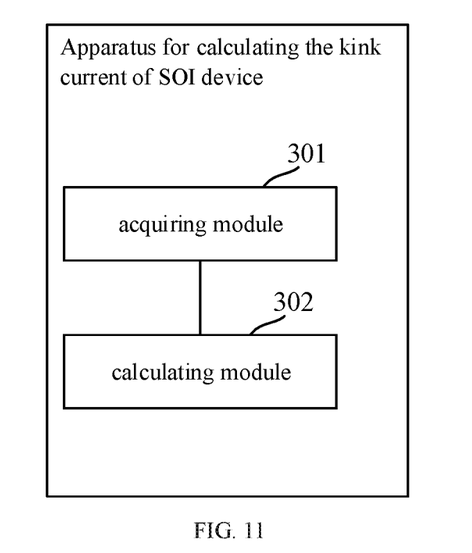
FIG. 11 is a block diagram of the kink current calculation apparatus for an SOI device provided by one embodiment of the present application.

Referring to FIG. 11, in the software implementation, the kink current calculation apparatus for SOI device comprises an acquiring module 301 and a calculating module.

The acquiring module 301 is used to obtain the impact ionization factor, the parasitic transistor effect factor, and the drain saturation current of the SOI device respectively. The calculating module 302 is used to calculate the kink current of the SOI device according to the impact ionization factor, the parasitic transistor effect factor, and the drain saturation current.

In the software implementation, the kink current calculation apparatus of the SOI device substantially corresponds to the kink current calculation method of the SOI device mentioned in the above embodiments, which will not be described in detail here.

The system, apparatus, module, or unit illustrated in the aforementioned embodiments may be specifically implemented by a computer chip or an entity, or a product having a certain function. A typical implementation device is a computer, and the specific form of the computer may be a personal computer, a laptop computer, a cell phone, a camera phone, a smart phone, a personal digital assistant, a media player, a navigation device, an email transmission and reception device, a game console, a tablet computer, a wearable device, or a combination of any of these devices.

In a typical configuration, a computing device includes one or more processors (CPUs), an input/output interface, a network interface, and a memory.

The memory can include a non-persistent memory, a random access memory (RAM), a nonvolatile memory, and/or another form of memory in computer-readable media, for example, a read-only memory (ROM) or a flash random access memory (flash RAM). The memory is an example of a computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic disk memory or another magnetic storage device, or any other non-transmission medium that can be used to store information accessible to the computing device. Based on the definition in the present specification, the computer-readable medium does not include computer-readable transitory media (transitory media), such as a modulated data signal and carrier.

It is worthwhile to further note that, the terms "include", "comprise", or their any other variants are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

Specific implementations of the present application are described above. Other implementations fall within the scope of the appended claims. In some situations, the actions or steps described in the claims can be performed in an order different from the order in the implementations and the desired results can still be achieved. In addition, the process shown in the accompanying drawings does not necessarily require a particular execution order to achieve the desired results. In some implementations, multi-tasking and parallel processing can be advantageous.

The terms used in the present application are for the purpose of describing particular embodiments only and are not intended to limit the present application. The singular forms "a", "an" and "the" used in the present application and the appended claims are also intended to include plural forms, unless the context clearly indicates otherwise. It should also be understood that the term "and/or" as used herein refers to and encompasses any or all possible combinations of one or more of the associated listed items.

It should be understood that although various types of information may be described using terms such as first, second, and third in the present application, such information should not be limited by these terms. These terms are only used to distinguish one type of information from another type of information. For example, first information may also be referred to as second information; similarly, second information may also be referred to as first information without departing from the scope of the present application. Depending on the context, the word "if" as used herein may be construed to mean "when . . . " or "upon . . . " or "in response to determining".

The above descriptions are merely some embodiments of the present application, and are not intended to limit the present application. Any alterations, equivalent substitutions, improvements and the like made within the spirit and principle of the present application shall fall within the protection scope of the present application.

What is claimed is:

1. A kink current calculation method for SOI device, comprising:
   obtaining impact ionization factor, parasitic transistor effect factor, and drain saturation current of the SOI device respectively;
   calculating the kink current of the SOI device according to the impact ionization factor, the parasitic transistor effect factor, and the drain saturation current,
   wherein obtaining the parasitic transistor effect factor of the SOI device specifically includes: obtaining channel length and carrier diffusion length in body region of the SOI device, and calculating the parasitic transistor effect factor of the SOI device according to the channel length and the carrier diffusion length in the body region.

2. The method according to claim 1, wherein the parasitic transistor effect factor of the SOI device has a hyperbolic secant dependence on channel length and carrier diffusion length in body region of the SOI device.

3. The method according to claim 1, wherein the impact ionization factor of the SOI device has an exponential relationship with threshold field $F_I$ characterizing the impact ionization, depletion region width $l_d$, drain voltage $V_D$, and interpolation function $V_{Dse}$ related to drain saturation voltage of the SOI device;
   alternatively, the impact ionization factor of the SOI device has an exponential relationship with drain voltage $V_D$, voltage parameter $V_k$ associated with kink effect, and interpolation function $V_{Dse}$ related to drain saturation voltage of the SOI device.

4. The method according to claim 1, wherein the calculation method for kink current $I_{kink}$ of the SOI device is:

$$I_{kink} = C \frac{(V_D - V_{Dse})}{l_d} \exp\left(-\frac{F_I l_d}{V_D - V_{Dse}}\right) \mathrm{sech}\left(\frac{L}{L_b}\right) I_{Dsat}; \quad (1)$$

where C is a parameter related to material and geometry of the SOI device, L is channel length of the SOI device, $V_D$ is drain voltage of the SOI device, $V_{Dse}$ is interpolation function related to the drain saturation voltage, $l_d$ is depletion region width of the SOI device, $F_I$ is threshold field for impact ionization of the SOI device, $L_b$ is carrier diffusion length in body region of the SOI device, and $I_{Dsat}$ is drain saturation current of the SOI device;
alternatively, the calculation method for kink current $I_{kink}$ of the SOI device is:

$$I_{kink} = C_k \frac{(V_D - V_{Dse})}{V_k} \exp\left(-\frac{V_k}{V_D - V_{Dse}}\right) \mathrm{sech}\left(\frac{L}{L_b}\right) I_{Dsat}; \quad (2)$$

where $C_k$ is a parameter related to material and geometry of the SOI device, L is channel length of the SOI device, $V_D$ is drain voltage of the SOI device, $V_{Dse}$ is interpolation function related to the drain saturation voltage, $V_k$ is voltage parameter associated with the kink effect, $L_b$ is carrier diffusion length in body region of the SOI device, and $I_{Dsat}$ is drain saturation current of the SOI device.

5. The method according to claim 4, wherein the method further comprises:
   parameter extraction of the threshold field $F_I$:
   obtaining drain current $I_D$ and drain saturation current $I_{Dsat}$ of multiple long-channel SOI devices with fixed channel width but varied channel lengths at multiple gate voltages;
   using equation (1) to establish function with the threshold field $F_I$ as slope in long-channel SOI devices;
   according to the drain current $I_D$ and drain saturation current $I_{Dsat}$ of the multiple long-channel SOI devices at multiple gate voltages, and the function with the threshold field $F_I$ as the slope in long-channel devices, calculating the threshold fields for impact ionization of the multiple long-channel SOI devices at multiple gate voltages.

6. The method according to claim 5, wherein the method further comprises:
averaging the threshold fields for impact ionization of each long-channel SOI device at multiple gate voltages, respectively, and obtaining the initial fitting value of the threshold field $F_I$ in equation (1) of each long-channel SOI devices.

7. The method according to claim 4, wherein the method further comprises:
extraction of the parameter $V_k$:
obtaining drain current $I_D$ and drain saturation current $I_{Dsat}$ of multiple long-channel SOI devices with fixed channel width but varied channel lengths at multiple gate voltages;
using equation (2) to establish the function with $V_k$ as the slope in long-channel SOI devices;
according to the drain current $I_D$ and drain saturation current $I_{Dsat}$ of the multiple long-channel SOI devices at multiple gate voltages, and the function with $V_k$ as the slope in long-channel devices, calculating $V_k$ values of the multiple long-channel SOI devices at multiple gate voltages.

8. An electronic apparatus, comprising:
one or more processors; and
one or more computer memory devices arranged to store computer-executable instructions, wherein the one or more processors execute the computer-executable instructions to implement the kink current calculation method for an SOI device according to claim 1.

9. The method according to claim 2, wherein the parasitic transistor effect factor is:

$$\text{sech}\left(\frac{L}{L_b}\right)$$

where L is the channel length of the SOI device and $L_b$ is the carrier diffusion length in the body region of the SOI device.

10. The method according to claim 3, wherein the impact ionization factor is:

$$\frac{(V_D - V_{Dse})}{l_d}\exp\left(-\frac{F_I l_d}{V_D - V_{Dse}}\right);$$

alternatively, the impact ionization factor is:

$$\frac{(V_D - V_{Dse})}{V_k}\exp\left(-\frac{V_k}{V_D - V_{Dse}}\right).$$

11. The method according to claim 5, wherein the method further comprises:
parameter extraction of the carrier diffusion length $L_b$ in the body region:
using equation (1) to establish function with $$-\frac{1}{L_b}$$

as the slope in long-channel SOI devices;
calculating average value of the threshold fields for impact ionization of each long-channel SOI device at multiple gate voltages, respectively;
according to the average value of the threshold fields for impact ionization of each long-channel SOI device at multiple gate voltages, and the function with $$-\frac{1}{L_b}$$

as the slope in long-channel devices, calculating the carrier diffusion lengths in the body region of the multiple long-channel SOI devices at multiple gate voltages.

12. The method according to claim 11, wherein the method further comprises:
averaging the carrier diffusion lengths in the body region of the multiple long-channel SOI devices at multiple gate voltages, and obtaining the fitting value of the carrier diffusion length $L_b$ in the body region in equation (1).

13. The method according to claim 11, wherein the method further comprises:
extraction of the parameter C:
calculating average value of carrier diffusion lengths in the body region of the multiple long-channel SOI devices at multiple gate voltages;
according to the average value of carrier diffusion lengths in the body region of the multiple long-channel SOI devices at multiple gate voltages, and the average value of the threshold fields for impact ionization of each long-channel SOI device at multiple gate voltages, calculating the parameter C in equation (1) of the multiple long-channel SOI devices at multiple gate voltages.

14. The method according to claim 13, wherein the method further comprises:
taking average value of the parameter C of the multiple long-channel SOI devices at multiple gate voltages as initial fitting value of the parameter C in equation (1);
substituting the initial fitting value of the parameter C into equation (1), and according to average value of the carrier diffusion lengths in the body region of the multiple long-channel SOI devices at multiple gate voltages, determining the threshold field for impact ionization of each SOI device at multiple gate voltages, respectively, as fitting value of the threshold field $F_I$ in equation (1) of each long-channel SOI device;
repeating the parameter C extraction steps to obtain the fitting values of the parameter C in equation (1) for the multiple long-channel SOI devices at multiple gate voltages.

15. The method according to claim 7, wherein the method further comprises:
parameter extraction of carrier diffusion length $L_b$ in the body region and $C_k$:
using equation (2) to establish function with $$-\frac{1}{L_b}$$

as slope and $\ln(2C_k)$ as intercept in long-channel SOI devices;

calculating $V_k$ average value of each long-channel SOI device at multiple gate voltages, respectively;

according to the $V_k$ average value of each long-channel SOI device at multiple gate voltages, and the function with $$-\frac{1}{L_b}$$

as the slope, $\ln(2C_k)$ as the intercept in long-channel devices, calculating the carrier diffusion length $L_b$ in the body region and $C_k$ of the multiple long-channel SOI devices at multiple gate voltages.

16. The method according to claim 15, wherein the method further comprises:

averaging $C_k$ values of the multiple long-channel SOI devices at multiple gate voltages, and obtaining the fitting value of $C_k$ in equation (2); and/or, averaging the carrier diffusion lengths in the body region of the multiple long-channel SOI devices at multiple gate voltages, and obtaining the fitting value of the carrier diffusion length $L_b$ in the body region in equation (2); and/or, substituting the average value of parameter $C_k$ and the carrier diffusion length $L_b$ in the body region of the multiple long-channel SOI devices at multiple gate voltages into equation (2), respectively, and obtaining the $V_k$ fitting values in equation (2) of the multiple long-channel SOI devices at multiple gate voltages.

* * * * *